(12) United States Patent
Waldstädt

(10) Patent No.: US 12,714,116 B2
(45) Date of Patent: Aug. 25, 2026

(54) DISCHARGE SECTION FOR A DISCHARGE OF SAUSAGE-SHAPED PRODUCTS

(71) Applicant: Poly-clip System GmbH & Co. KG, Hattersheim (DE)

(72) Inventor: Manfred Waldstädt, Mainz (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 67 days.

(21) Appl. No.: 18/196,212

(22) Filed: May 11, 2023

(65) Prior Publication Data

US 2023/0363399 A1 Nov. 16, 2023

(30) Foreign Application Priority Data

May 12, 2022 (EP) .................................... 22173086

(51) Int. Cl.
*A22C 11/12* (2006.01)
*A22C 15/00* (2006.01)

(52) U.S. Cl.
CPC .......... *A22C 11/125* (2013.01); *A22C 11/127* (2013.01); *A22C 15/001* (2013.01); *A22C 15/002* (2013.01)

(58) Field of Classification Search
CPC ..... A22B 7/005; A22C 11/008; A22C 11/127; A22C 15/001; A22C 15/002
USPC .......................................................... 452/51
See application file for complete search history.

(56) References Cited

U.S. PATENT DOCUMENTS 7,828,638 B2 * 11/2010 Waldstadt .............. B65G 33/04 452/177
8,540,555 B2 * 9/2013 Reitz .................... A22C 11/125 452/46
8,747,192 B2 * 6/2014 Sames .................... B65G 47/61 452/51
10,986,846 B2 * 4/2021 Waldstädt .............. B65G 47/61
(Continued)

FOREIGN PATENT DOCUMENTS

EP 1897446 A2 3/2008
EP 2103221 A1 9/2009
EP 2977339 A1 1/2016

OTHER PUBLICATIONS

EPO; Application No. 22173086.4; Extended European Search Report dated Nov. 11, 2022.

*Primary Examiner* — David J Parsley
(74) *Attorney, Agent, or Firm* — Fitch, Even, Tabin & Flannery LLP

(57) ABSTRACT

The invention relates to a discharge section for a discharge of products with at least one suspension element, in particular, for sausage-shaped products, along the discharge section. The discharge section comprises a catcher unit and a guide unit. The catcher unit comprises a catching end and is configured for threading at least one suspension element of the product with the catching end. The guide unit is configured for receiving the at least one suspension element of the product from the catcher unit and for transporting the product at its at least one suspension element along the discharge section. The discharge section is characterized in that the catcher unit and the guide unit are releasably attached to each other by an attachment mechanism. The attachment mechanism is configured to enable an adjustment of a position of the catcher unit's catching end relative to the guide unit.

15 Claims, 9 Drawing Sheets

(56) References Cited

U.S. PATENT DOCUMENTS

| | | | | |
|---|---|---|---|---|
| 2005/0042979 | A1 * | 2/2005 | Sames .................. | A22C 15/002<br>452/51 |
| 2009/0227190 | A1 | 9/2009 | Waldstadt et al. | |

* cited by examiner 104
124
132

138
152
142
150
140
106
102
100

132
114
104
134
122
138
142
146
126
144
154
100
106

DISCHARGE SECTION FOR A DISCHARGE OF SAUSAGE-SHAPED PRODUCTS

CROSS-REFERENCE TO RELATED APPLICATION

The present application claims the benefit of priority of European Patent Application No. 22173086.4, filed on May 12, 2022, the content of which is incorporated herein by reference in its entirety.

FIELD OF THE INVENTION

The invention relates to a discharge section for a discharge of products with at least one suspension element. Furthermore, the invention relates to a discharge apparatus comprising the discharge section. The invention may be used in the technical field of meat processing and, in particular, in the technical field of fabrication of sausages, for example, using an automated production line.

BACKGROUND ART

An automated production line for producing sausage-shaped products often comprises a clipping machine for producing the sausage-shaped products, a discharge device for discharging the sausage-shaped products out of the clipping machine and a feeding device for feeding a rod-like element into a loading position in which the sausage-shaped products are transferred onto the rod-like element. For loading a rod-like element with sausage-shaped products, suspension loops attached to the sausage-shaped products may be grabbed by a transfer device, which takes the sausage-shaped products from the discharge device and transfer it to the rod-like element.

An exemplary automated production line is described in EP 1 897 446 A2. In the automated production line described therein, a filling unit is employed for filling a filling material via a filling tube into a tubular or bag-shaped packaging casing. Subsequently, a clipping machine is used for portioning and closing the sausages using closure means, like clips. In this regard, single-clippers and double-clippers are known. With a double-clipper, two closures are set simultaneously to close one sausage and to start the next yet unfilled packaging unit. A knife then cuts through the packaging casing between the two clips and the next packaging unit is ready to be filled.

Together with a clip, a flexible suspension element such as a suspension loop is generally attached to a sausage. Such a flexible suspension element can be used for transporting the sausages and for stringing the sausages on a rod for further processing such as boiling or smoking. Yet, for stringing the sausages on a rod, an automated production line generally comprises a discharge apparatus for removing the produced sausages from the clipping machine and for transporting the sausages to the rod.

A discharge apparatus generally comprises a discharge section as described inter alia in EP 2 103 221 A1. The transport device implementing a discharge section as described therein has a screw conveyor for transporting sausage products hanging on loops. The transport device comprises a first screw conveyor section and a drive means for the first screw conveyor section. The drive torque is transferred to the screw conveyor section via the outer circumferential area of the first screw conveyor section. The transport device further comprises a first support assembly for the first screw conveyor section. The transport device has a second screw conveyor section, which immediately adjoins the first screw conveyor section in the direction of transport. The first and the second screw conveyor sections are provided as hollow shafts. The right-hand end of the second screw conveyor section is inserted into the left-hand end of the first screw conveyor section.

SUMMARY OF THE INVENTION

Yet, it is still desirable to further improve the fabrication of sausage-shaped products and, in particular, to provide an efficient and easy transfer of the sausage-shaped products within an automated production line of the kinds referred to above.

The invention is based on the objective of providing an improved discharge section, in particular, for a discharge apparatus that is to be used as part of an automated production line for the fabrication of sausage-shaped products or the like. The discharge section, in particular, shall enable a more accurate alignment with respect to other machines such as a clipping machine. Thereby, with the discharge section it shall be possible to facilitate a handling of the products, e.g., as provided by a clipping machine.

According to the invention, a discharge section is proposed for a discharge of products with at least one suspension element, in particular, for sausage-shaped products, along the discharge section. The discharge section comprises a catcher unit and a guide unit.

The catcher unit comprises a catching end and is configured for catching at least one suspension element of the product with the catching end. The guide unit is configured for receiving the at least one suspension element of the product from the catcher unit and for transporting the product at its at least one suspension element along the discharge section.

The discharge section is characterized in that the catcher unit and the guide unit are releasably attached to each other by means of an attachment mechanism. The attachment mechanism is configured to enable an adjustment of a position of the catcher unit's catching end relative to the guide unit.

The invention includes the recognition that an automated production line for the production of sausage-shaped products generally comprises several machines that have to be arranged to each other to enable an efficient transfer of the product within the production line. After a sausage-shaped product is produced, e.g., by a clipping machine, the sausage-shaped product is removed at its suspension element, e.g., a flexible suspension loop or a suspension hook, from the clipping machine and transported at its suspension element to a rod of a feeding device. Eventually, the sausage-shaped product is stringed on the rod on its suspension element. Accordingly, the transfer of the sausage-shaped product within an automated production line particularly depends on an efficient handling of the sausage-shaped product's suspension element.

The transfer of the sausage-shaped product generally starts with the discharge of the sausage-shaped product from, e.g., a clipping machine, with the discharge apparatus. In particular, the suspension element is generally attached to the sausage-shaped product just below a catching end of a discharge section of the discharge apparatus. The sausage-shaped product is then lifted up to guide the suspension element over the catching end. Thereby, the suspension element is caught and threaded by the discharge section to be transported to a rod.

The catching of the suspension element with the catching end generally requires a comparatively accurate alignment of the discharge section's catching end with respect to the sausage-shaped product's suspension element as provided, e.g., by a clipping machine. However, often, a discharge apparatus containing the discharge section is a comparatively large and heavy device making an exact alignment tedious. In addition, the discharge apparatus generally is not only aligned to a clipping machine but also to further machines such that changing the position of the discharge apparatus may require also an adjustment of the positions of several further machines. Accordingly, such an alignment process may be comparatively time-consuming.

With the discharge section according to the invention it is possible to achieve an alignment of the discharge section's catching end relative to a reference position with comparatively high accuracy. In particular, with the discharge section it is not necessary to move a complete discharge apparatus for alignment purposes but to perform the alignment solely with the discharge section itself. This may have the advantage, that an alignment with respect to a reference position, e.g., a position where the catching end shall catch suspension elements of provided products, is facilitated and may also be implemented faster and with higher accuracy.

This is achieved with the discharge section according to the invention in that the catcher unit and the guide unit are releasably attached to each other by means of an attachment mechanism. The catcher unit and the guide unit are thus separate elements. With the attachment mechanism, the catcher unit and the guide unit can be fixed to each other to literally form a single piece. However, since the catcher unit and the guide unit are releasably attached to each other by means of an attachment mechanism, the attachment can be loosened to detach the catcher unit from the guide unit. For adjusting the position of the catching end relative to the guide unit and thereby to a reference position, the attachment mechanism can be employed by losing the attachment, bringing the catching end in the desired position relative to the guide unit and then closing again the attachment between catcher unit and the guide unit. It is thus the attachment mechanism enabling a flexible and releasable connection between the catcher unit and the guide unit that allows an accurate and comparatively easy way of adjusting the catching end's relative position.

The discharge section is particularly suitable for a discharge of products such as sausages or the like that contain a flowable filling material in a tubular or bag-shaped packaging casing and a suspension element, like a suspension loop or a suspension hook. The filling material can be sausage meat, sealing material, granular material or the like.

The catcher unit, preferably, comprises a catching needle and a widening member for widening a diameter of the product's at least one suspension element. Widening the diameter particularly refers to a widening in a lateral direction that is perpendicular to a transport direction along the discharge section. With the widening member, an opening of the suspension element may be increased by bringing the suspension element in a more circular or drop-like shape. The catching needle, preferably, is attached to the widening member with its one end. The other end is the catching needle's free end and forms the catching end of the catcher unit. Alternatively, the catching needle may be a catching pin or the like. From a functional point of view, the catching needle or the catching pin is configured to enable a catching and threading of the suspension element and the widening member is configured to continuously widen the opening formed by the suspension element. The widening member can be cone-shaped with its flat base pointing towards the guide unit and with its apex pointing towards the catching end. Thereby, when the suspension element moves from the catching needle to the guide unit, its opening becomes steadily widened by the cone-shaped widening member. The flat base of the widening member can have the same or at least a similar diameter as the guide unit such that the widening member provides a smooth and rather continuous transfer of the suspension element from the catcher unit to the guide unit.

The catching needle or catching pin may be releasably connected to the widening member to further facilitate an alignment of the catching end's relative position. For example, for aligning the catching end, the attachment between catching needle or pin and the widening member may be released. The widening member may then be translated or rotated independently of the catching needle or pin. It may be further more beneficial if the attachment of the catching needle or catching pin to the widening member also is configured to provide means for adjusting the position of the catching end relative to the widening member. The means for attaching the catching needle to the widening member may be configured comparable to the attachment mechanism that is configured for attaching the catcher unit to the guide unit, i.e., the means for attaching the catching needle to the widening member may also comprise an attachment pin, an attachment hole and an attachment member as described before.

For example, it may be beneficial if the attachment between the catching needle or catching pin and the widening member is configured to enable a translation or rotation of the catching end relative to the widening member, in particular, relative to an axial direction of the widening member. Such an attachment may be used for fine-tuning the relative position of the catching end.

Preferably, the attachment mechanism is configured to enable an adjustment of the catching end's relative position parallel to an axial direction of the guide unit. Accordingly, with the attachment mechanism it shall be possible to move the catching end further away from the guide unit or to move the catching end towards the guide unit. For example, the guide unit itself may stand still relative to, e.g., a clipping machine or the like, and only the catching end is moved towards or away from a reference position, e.g., a catching position for catching suspension elements. It is particularly preferred that the attachment mechanism is configured to provide an adjustment of the catching end within a predefined distance range of distances between catching end and the guide unit. In this case, there may be a minimum distance between the catching end and the guide unit and a maximum distance between the catching end and the guide unit and a plurality of distance in between at which the catcher unit can be fixed in position relative to the guide unit to adjust the relative position of the catching end. It may be beneficial, in addition, that the attachment mechanism is configured for allowing a rotation of the catching end relative to the guide unit, e.g., around a guide unit's longitudinal axis, for adjusting a relative position of the catching end.

Preferably, the attachment mechanism is configured to enable an adjustment of the catching end's position in a continuous manner. Thereby, it is possible to fix the catching end in a plurality of different positions to corporate with a plurality of different machines such as clipping machines.

Alternatively, the attachment mechanism may be configured to enable an adjustment of the catching end's position in several discrete steps. This way, an improved control for the adjustment of the catching end's relative position may be achieved. In particular, an adjustment of the catching end's position in several discrete steps facilitates a return to a previous position after a relative position of the catching end has been changed.

Preferably, the attachment mechanism comprises an attachment pin formed as part of the guide unit and an attachment hole configured for receiving the attachment pin and being formed as part of the catcher unit. Alternatively, the attachment mechanism may comprises an attachment pin formed as part of the catcher unit and an attachment hole configured for receiving the attachment pin may be formed in the guide unit. Preferably, the attachment pin is positioned in the attachment hole for releasably attaching the catcher unit and the guide unit to each other. With the attachment pin and the attachment hole, a push-in connection may be achieved. With the attachment pin and the attachment hole, the relative position of the catching end may be adjusted within a predefined range of distances parallel to an axial direction of the guide unit. The predefined range of distances may be defined by the lengths of the attachment pin and the attachment hole, e.g., by the maximum length the attachment pin can be moved and still fixed inside the attachment hole.

Since the attachment pin can be moved inside the attachment hole, a relative position of the catching end may be adjusted in a comparatively easy manner by adjusting a length of the attachment pin inside the attachment hole. The attachment hole, in particular, is configured complementary to the pin, e.g., in terms of cross-section and/or length. The guide unit and the catcher unit may have some overlapping area that allows moving the attachment pin inside the attachment hole without forming a gap between the catcher unit and the guide unit. Thereby, the suspension element can be transferred from the catcher unit to the guide unit without being stopped on its way along the discharge section, e.g., by a gap or a step formed at the transition from the catcher unit to the guide unit.

The attachment pin may have circular cross-section or a polygonal cross-section and the attachment hole preferably has a cross-section that is complementary to the pin's cross-section. A circular cross-section has the advantage that the attachment pin can be freely translated and rotated inside the attachment hole. It is therefore possible to adjust the catching end's relative position relatively freely. A polygonal cross-section enables a translation of the attachment pin inside the attachment hole but prevents the attachment pin from being freely rotated. A relative position of the catching end can thus be adjusted in a controlled manner in a direction parallel to an axial direction of the guide unit. Of course, the attachment pin may be removed completely from the attachment hole and inserted again at a rotated position. Thereby, it is possible to effectively rotate the attachment pin in several discrete steps.

In some embodiments, the attachment pin comprises an external thread and the attachment hole comprises an internal thread such that the catcher unit and the guide unit are attached to each other by screwing in the attachment pin into the attachment hole. The external thread can also be present in a certain section of the pin, only, such that the remaining part of the attachment pin may used for fixation of the attachment pin inside the attachment hole. For fixation of the attachment pin inside the attachment hole, the external thread of the attachment pin and/or the internal thread of the attachment hole may also be implemented as a self-locking thread. In these embodiments, the relative position of the catching end may be adjusted by rotating the threaded attachment pin inside the threaded attachment hole. In these cases, it may be particularly beneficial that a catching needle or catching pin is releasably connected to a widening member such that while rotating the widening member relative to the guide unit, the catching needle or catching pin may not be rotated but may be held in a stationary position.

Alternatively to only one single attachment hole, the attachment mechanism may also comprise at least two attachment holes. The at least two attachment holes may each have a different attachment hole depth. The at least two attachment holes may thus be configured such that the attachment pin can be inserted into each of the at least two attachment holes with a different maximum length. This allows an adjustment of the catching end's relative position in at least two steps. The depth of the at least two attachment holes may also be chosen such that they are associated with preferred relative positions of the catching end. It is then possible to bring the relative position of the catching end in one of the preferred relative positions by inserting the attachment pin in the respective attachment hole. Thereby, it is possible to store and remember the preferred relative position by means of the depth of the respective attachment hole. The at least two attachment holes can be arranged on a circle at a distance to a central axis pointing along an axial direction of the guide unit or the catcher unit. The attachment mechanism may also comprise several pins that are arranged complementary to the arrangement of the attachment holes. The pins may have the same lengths or may have different lengths to enable an attachment of the guide unit and the catcher unit at various different predefined configurations translating to several different relative positions of the catching end.

Preferably, the attachment mechanism comprises an attachment member that is configured for fixation of the attachment pin inside the attachment hole. The attachment member may be a screw, a clamp, a pin, a hook or the like. Accordingly, the attachment pin may comprise a complementary structure such as a recess that is configured for receiving the attachment member. Preferably, the attachment member may be configured for fixation of the attachment pin inside the attachment hole and may be configured to be released for enabling a movement of the attachment pin inside the attachment hole for adjusting the relative position of the catching end. When the relative position of the catching end has been adjusted, the attachment member may be used for fixation of the attachment pin in the new position.

For example, the attachment member may be a threaded attachment member accommodated in a fixation thread configured to enable traction of the attachment pin housed in the attachment hole for fixing the attachment pin inside the attachment hole. The fixation thread may be part of the catcher unit and preferably ends at the attachment hole. The threaded attachment member may then be screwed into the fixation thread and may extend into the attachment hole. If the attachment pin is arranged inside the attachment hole, the threaded attachment member may contact the attachment pin and enable traction of the attachment pin to prevent the attachment pin from being moved inside the attachment hole. The attachment pin may also comprise one or more recesses on its outer surface that are configured such that the threaded attachment member may extend into a respective one of the recesses. The recesses may define discrete fixation positons of the attachment pin. The recesses may interrupt an external thread of the attachment pin such that the attachment pin can be screwed into the attachment hole with internal thread into a position where the attachment pin can be fixed inside the attachment hole by moving the attachment pin into one of the recesses to provide traction of the attachment pin. Thereby, the external thread of the attachment pin is not damaged when fixing the attachment pin inside the attachment hole with the threaded attachment member by means of traction.

The guide unit may have a cylindrical shape with a smooth surface such that the product can slide along the guide unit at its suspension element. The guide unit may have a varying diameter. In particular, the guide unit's diameter may increase continuously starting from the catcher unit. The guide unit may be made of a single piece of material, e.g., a rigid body, or may be made of various different components.

For example, it is particularly preferred that the guide unit comprises a bolt and a hollow shaft that is rotatable arranged on the bolt. Preferably, the attachment pin or the attachment hole is formed as part of the bolt. Preferably, the attachment pin has a diameter that is different from the diameter of the rest of the bolt. In particular, the diameter of the attachment pin is preferably smaller than the diameter of the rest of the bolt. The hollow shaft may be configured for transporting the product at its suspension element along the discharge section. For example, the hollow shaft may comprise a thread groove winding around the outer surface of the hollow shaft for transporting the product at its suspension element inside the groove along the discharge section. To this end, the hollow shaft can be rotated using a driving member, e.g., comprising an electric motor. Preferably, the bolt stays stationary and does not move when the hollow shaft is rotated. For example, the hollow shaft may be rotatable arranged on the bolt by means of one or more ball bearings. Alternatively to a thread groove winding around the outer surface, the hollow shaft may have a smooth surface such that the suspension element may slide over hollow haft.

The discharge section may further comprise a guiding member that is configured for guiding the product along at least a part of the length of the guide unit. The guiding member may be implemented as a wire-shaped or tubular structure having a comparatively smaller diameter that is guided parallel to the guide unit at a predefined distance. The guiding member may be used for guiding the product at its suspension element at a distance from the guide unit. In particular, the guiding member may reduce rocking of the product on its suspension element while the product is passed along the catcher unit and/or the guide unit.

The guiding member may be mounted to the catcher unit at a mounting position by means of a mounting mechanism that may be configured to enable adjustment of a mounting position within a predefined mounting range. In particular, the mounting mechanism may be configured to choose the mounting position out of several possible mounting positions within the predefined mounting range. For example, the mounting position may be chosen according to an adjusted relative position of the catching end relative to the guide unit. Thus, the mounting positon preferably fits to the relative position of the catching end such that when adjusting the relative position of the catching end, the mounting position likewise may be adjusted to fit the new relative position of the catching end.

For example, the mounting mechanism may comprise a mounting hole formed as part of the catcher unit that is configured to enable the mounting of the guiding member at several mounting positions. The shape of the mounting hole may define the mounting range within which the mounting position may be selected. For example, the mounting hole may be configured as an elongated mounting hole allowing to change the mounting position along the elongated extension of the mounting hole. That end of the guiding member that contacts the elongated mounting hole may comprise an internal thread. From the opposite side of the elongated mounting hole, a screw may be guided through the elongated mounting hole and screwed into the internal thread to fasten the guiding member at the elongated mounting hole. Thereby, the mounting position of the screw can be chosen to fit the adjusted relative position of the catching end. Alternatively, at its end, the guide means may comprise a threaded part that may be guided through the elongated mounting hole and fastened, e.g., with a screw nut.

The elongated mounting hole, preferably, is arranged to define the mounting range in a direction that is substantially parallel to an axial direction of the guide unit. If the catcher unit is moved away from the guide unit or towards the guide unit, e.g., by moving an attachment pin inside an attachment hole, the mounting position of the guide means may be selected accordingly to fit the respective new relative position of the catching end.

The discharge section may further comprise at least one support unit arranged and configured to rotatably support the guide unit. The support unit, preferably, comprises three support rollers arranged uniformly around the circumference of the guide unit. The support rollers may be arranged with respect to the guide unit in such a way that the product may be guided along the guide unit at its suspension element passing by the respective support unit. Preferably, one of the support rollers has a section with teeth running around the circumference of this support roller, which perform the function of a pinion. The guide unit and, in particular, a hollow shaft of the guide unit, preferably, has teeth running around the circumference of the guide unit, which also fulfil the function of a pinion. The support unit and the guide unit may be arranged relative to one another in such a way that the two pinions mesh with one another so that torque can be transmitted between them. The support roller with pinion may, for example, be driven by a drive, for example, by means of a gear drive or a belt drive in order to set the guide unit in rotation.

The invention also relates to a discharge apparatus that is configured for a discharge of products with at least one suspension element, in particular, for sausage-shaped products, preferably out of a clipping machine that is configured for placing and closing clips on the product. The discharge apparatus, preferably, comprises the discharge section as described above. The discharge apparatus may further comprise a driving member for rotating a hollow shaft of the guide unit in order to transport a product at its suspension element along the guide unit.

The discharge apparatus may be part of an automated production line for the production of sausages. Such an automated production line may further comprise a clipping machine for producing the sausages and/or a feeding device for providing rods for stringing produced sausages for further processing, e.g., boiling or smoking.

It shall be understood that the discharge section of claim 1 and the discharge apparatus of claim 15, have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION

FIGS. 1 to 8 show different views of a discharge section 100 for a discharge of sausage-shaped products. Discharge section 100 may be part of a discharge apparatus (not shown in FIGS. 1 to 8). It is a particular advantage of discharge section 100 that a position of a catching end 102 can be adjusted for facilitating an alignment of catching end 102 relative to a reference position, e.g., a catching position for catching a suspension element of a sausage-shaped product.

Figure 9:
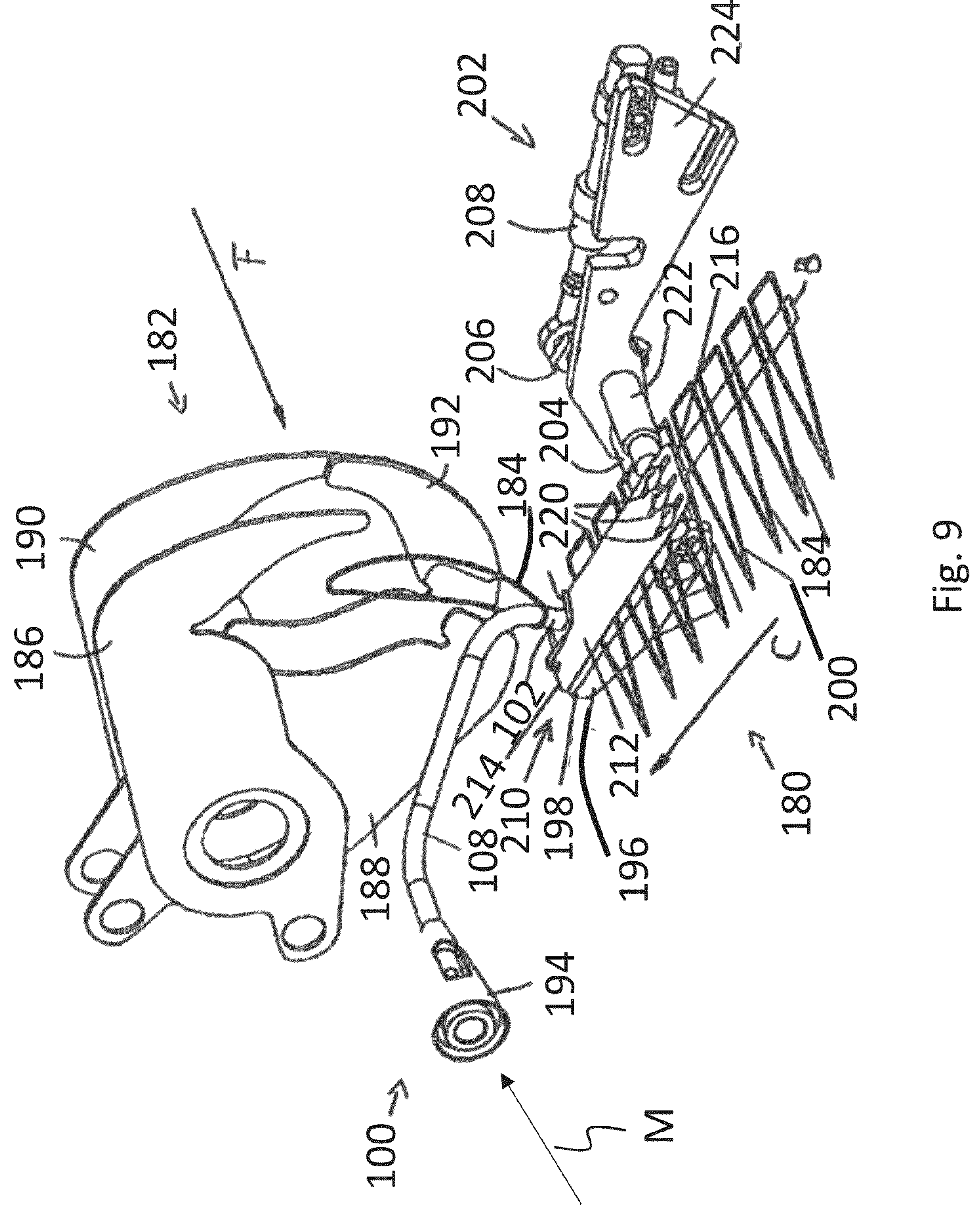
FIG. 9: shows the catching needle of the discharge device in conjunction with a feeding unit of a clipping machine for feeding flexible suspension elements, like loops, for being attached to sausage-shaped products.

FIG. 9 shows a discharge apparatus having discharge section 100 together with a clipping machine (only gathering means of the clipping machine are shown in FIG. 9). In particular, FIG. 9 shows how catching end 102 of discharge section 100 can be aligned relative to a feeding unit for feeding flexible suspension elements 184, like loops, to the clipping machine for being attached to sausage-shaped products by means of closure means, like closing clips.

Figure 1:
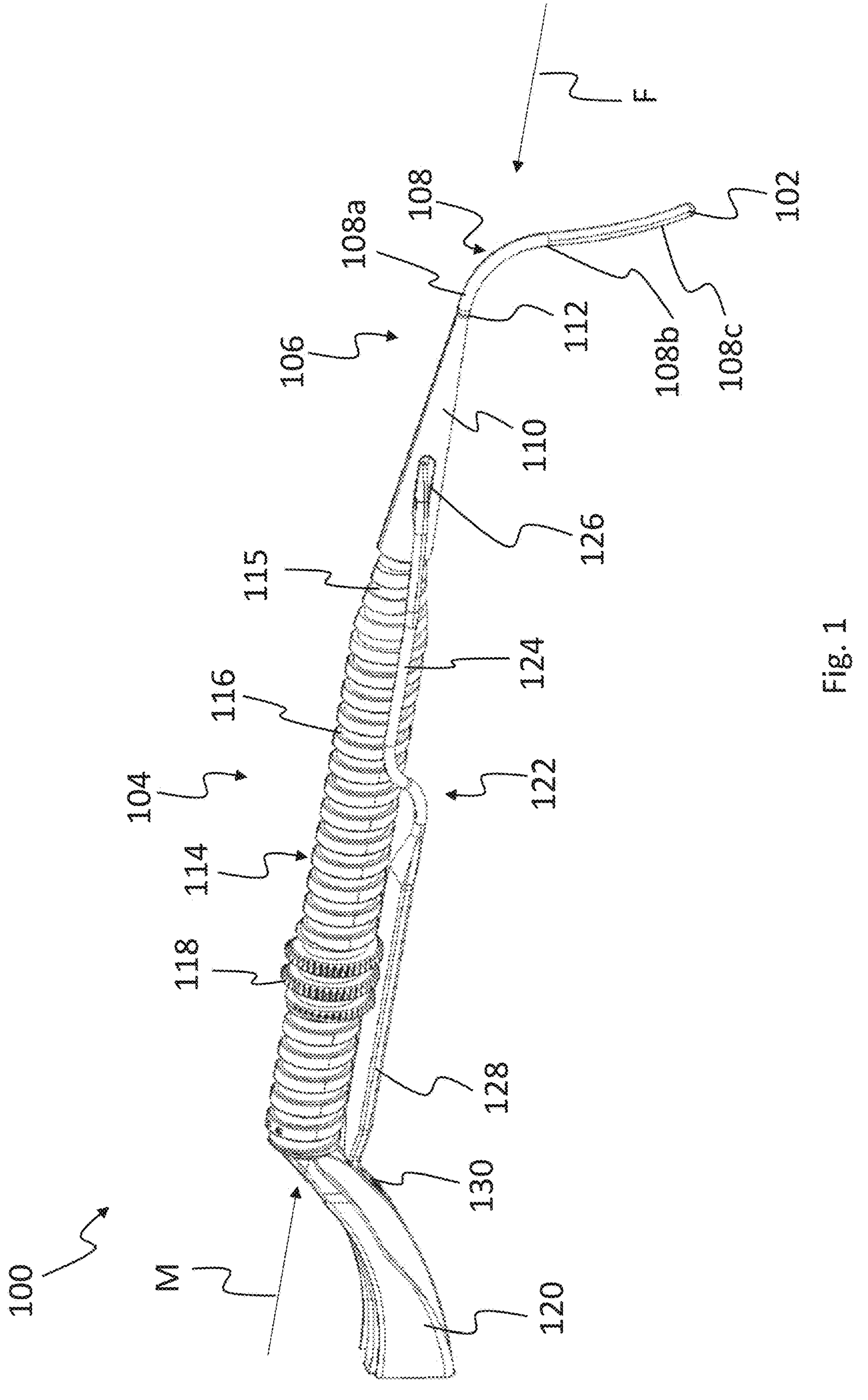
FIG. 1: shows a discharge section comprising a guide unit and a catcher unit, the catcher unit comprising a catching needle having a free end that forms the catching end of the discharge device.

As can be inferred from FIG. 1, discharge section 100 having a central longitudinal axis M and extending in use at least approximately horizontally and substantially at least approximately parallel to production and discharge or feeding direction F, comprises a guide unit 104 and a catcher unit 106. Catcher unit 106 faces opposite to feeding direction F (cf. FIG. 9). Guide unit 104 joins catcher unit 106 in feeding direction F.

Catcher unit 106 comprises a catching needle 108 having a free end that forms catching end 102 of discharge device 100. Catching needle 108 has a bent shape suitable for catching a suspension element such as a suspension loop attached to a product, e.g., a sausage or the like, and for guiding the suspension element to a widening member 110 that is attached to the catching needle's other end 112.

Catching needle 108 includes a first section **108*a*, by which it is attached to widening member 110. Adjacent thereto is a second section 108*b*, by which catching needle 108*b* is curved in a direction transverse to central longitudinal axis M of discharge section 100 and downwardly. This is followed by a third section 108*c*, by which catching needle 108*c* is bent downwardly at an angle at least approximately 90° so that free end 102 of catching needle 108** is oriented at least approximately vertically.

Widening member 110 has a cone shape with its apex being attached to end 112 of catching needle 108 opposite to its free end 102. The widening member's diameter continuously increases starting from its apex towards guide unit 104. If a flexible suspension element is transferred from catching needle 108 to widening member 110, the opening formed by the respective suspension member is continuously enlarged while moving along widening member 110. When reaching guide unit 104, the opening formed by said suspension element substantially corresponds to the shape of guide unit 104. For example, the sausage-shaped product may lie on a conveyor belt and is transported parallel to catcher unit 106 with its suspension element being threaded onto catching needle 108. When reaching guide unit 106, the product falls off the conveyor belt and hangs at its suspension element below guide unit 104. Guide unit 104 may then take over the transporting function for transporting the product along discharge section 100.

For transporting the suspension element with guide unit 106, guide unit 106 comprises a hollow shaft 114 that is rotatable around a central longitudinal axis M of discharge section 100. Hollow shaft 114 has a conical end shape 115, which is tapering towards catcher unit 106. Thereby, it is possible that hollow shaft 114 extends with its tapered end into widening member 110. This allows a smooth transmission of a suspension element from catcher unit 106 to guide unit 104 even when a relative position of catching end 102 is adjusted by moving catcher unit 106 away from guide unit 104. In this case, no gap is formed between guide unit 104 and catcher unit 106 that prevents the suspension element from being transported along guide unit 104.

On its outer surface, hollow shaft 114 comprises a profile implementing a thread groove winding 116. A suspension element may be arranged inside groove 116 such that the suspension element is pushed along thread groove winding 116 when rotating hollow shaft 114 around central longitudinal axis M. Hollow shaft 114 with thread groove winding 116 thereby implements a screw conveyor that conveys suspension elements along guide unit 106.

At some elevations between adjacent grooves, thread groove winding 116 is provided with a tooth-like structure 118 around its circumference that implement a pinion. Pinion 118 may be used for driving hollow shaft 114 to automatically transport hanging products along discharge section 100. After having travelled all the length along guide unit 106, the suspension elements with their attached products are provided to a transfer unit 120 that may be used for loading the products onto a rod for further processing such as boiling or smoking.

Discharge section 100 additionally comprises a guiding member 122 that extends at a distance parallel to guide unit 104. Guiding member 122 has a first section 124 with a circular cross-section, arranged at least approximately parallel to guide unit 104 and facing opposite to feeding direction F.

With its first section 124, guiding member 122 is mounted to widening member 110 by means of a mounting mechanism 126. Mounting mechanism 126 comprises an elongated mounting hole, which extends at least approximately parallel to central longitudinal axis M and at which guiding member 122 is mounted at a mounting position. The mounting position depends on the adjusted relative position of catching end 102 of catcher unit 106.

In first section 124, guiding member 122 is guided in a bow-shape centrally below guide unit 104. At this position, guiding member 122 continuous as a second section 128. In second section 128, guiding member 122 has an approximately rectangular cross-section with rounded edges. The lateral width of the cross-section is substantially similar to or at least only slightly smaller than the diameter of guide unit 104. In second section 128, guiding member 122 runs at least approximately centrally below and parallel to guide unit 104. With its other end 130, guiding member 122 is attached to transfer unit 120.

With guiding member 122 it is possible to guide the hanging product at its suspension element along discharge section 100 in a comparatively controlled manner, i.e., without swinging or rocking. In particular, second section 128 of guiding member 122 can be used to prevent excessive oscillation or swinging of the suspended products in a direction transverse to central longitudinal axis M.

Figure 2:
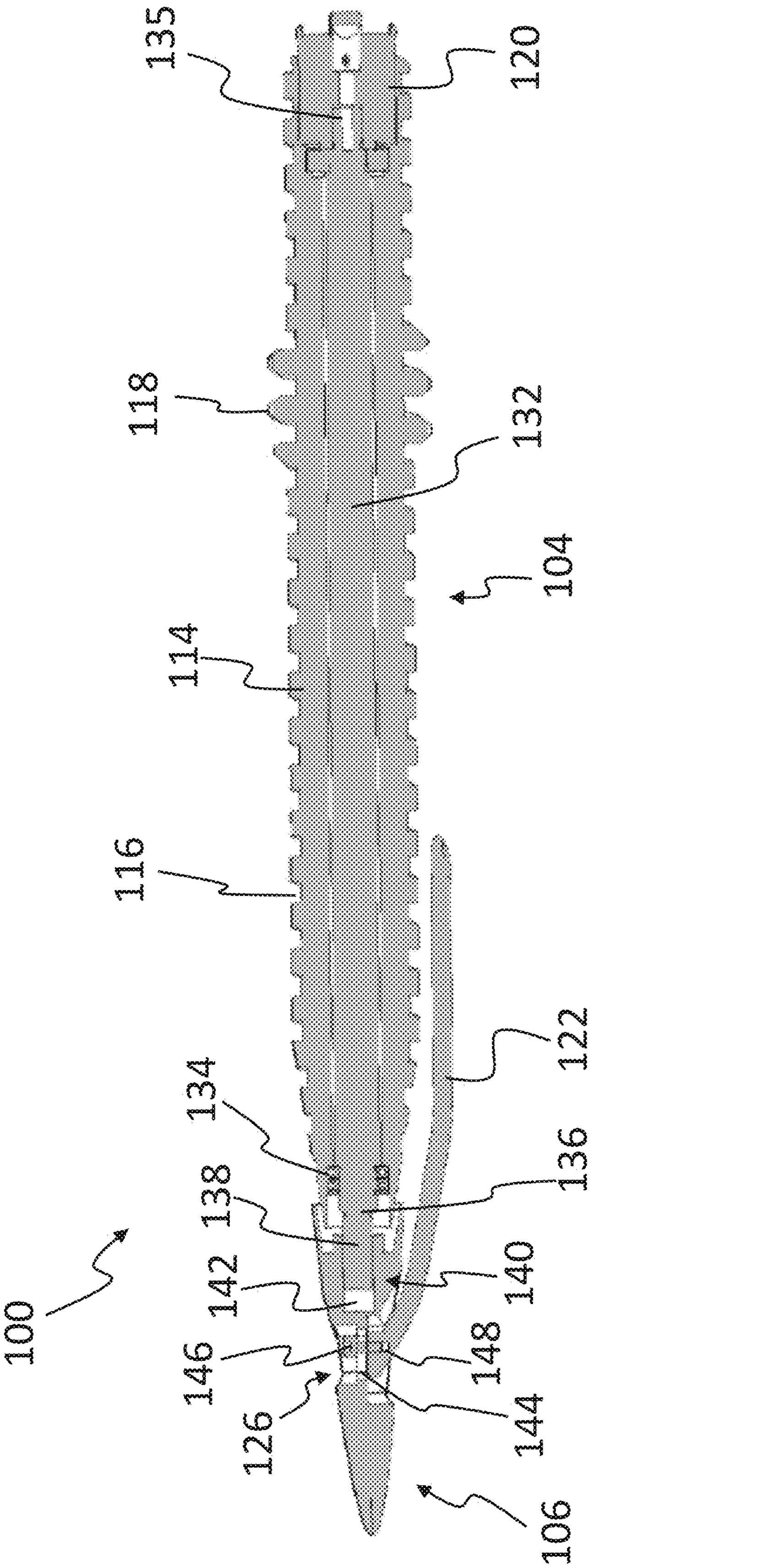
FIG. 2: shows the discharge section in a longitudinal sectional view.

FIG. 2 shows discharge section 100 in a longitudinal sectional view. In this view, it can be inferred that hollow shaft 114 is rotatably arranged on a bolt 132 by means of ball bearings 134 arranged at both ends of bolt 132. Hollow shaft 114 can be driven by a driving means such as an electric motor while bolt 132 stays stationary. For driving hollow shaft 114, some elevations 118 of thread groove winding 116 are equipped with teeth for implementing a pinion as mentioned above. On its one end 135, bolt 132 is attached to transfer unit 120. At its opposite end 136 facing opposite to feeding direction F, bolt 132 is formed into an attachment pin 138 that protrudes beyond or further than hollow shaft 114 and has a smaller diameter than the rest of bolt 132.

At its one end 136, bolt 132 connects guide unit 104 to catcher unit 106. In this view of catcher unit 106, only parts of widening member 110 are visible. Hollow shaft 114 tapers towards widening member 110 and extends into widening member 110 such that a comparatively smooth geometrical transition is established between catcher unit 106 and guide unit 104.

Attachment pin 138 is part of an attachment mechanism 140 that further comprises an attachment hole 142 which is formed as part of widening member 110 which extends at least approximately parallel to central longitudinal axis M. Attachment pin 138 is arranged inside attachment hole 142 and can be freely moved forward and backward therein. In addition, rotation of attachment pin 138 inside attachment hole 142 is possible. Thereby, it is possible to use attachment mechanism 140 for adjusting a position of catching end 102 relative to guide unit 104.

Mounting mechanism 126 for mounting guiding member 122 to widening member 110 comprises an elongated mounting hole 144 formed in widening member 110 at which guiding member 122 is attached by means of a mounting screw 146 screwed into an internal thread 148 of guiding member 122. Mounting mechanism 126 allows a movement of attachment pin 138 inside attachment hole 142 along an axial direction of guide unit 104. In dependence on the adjusted relative position of catching end 102, guiding member 122 may be mounted to widening member 110 using mounting screw 146.

Figure 3:
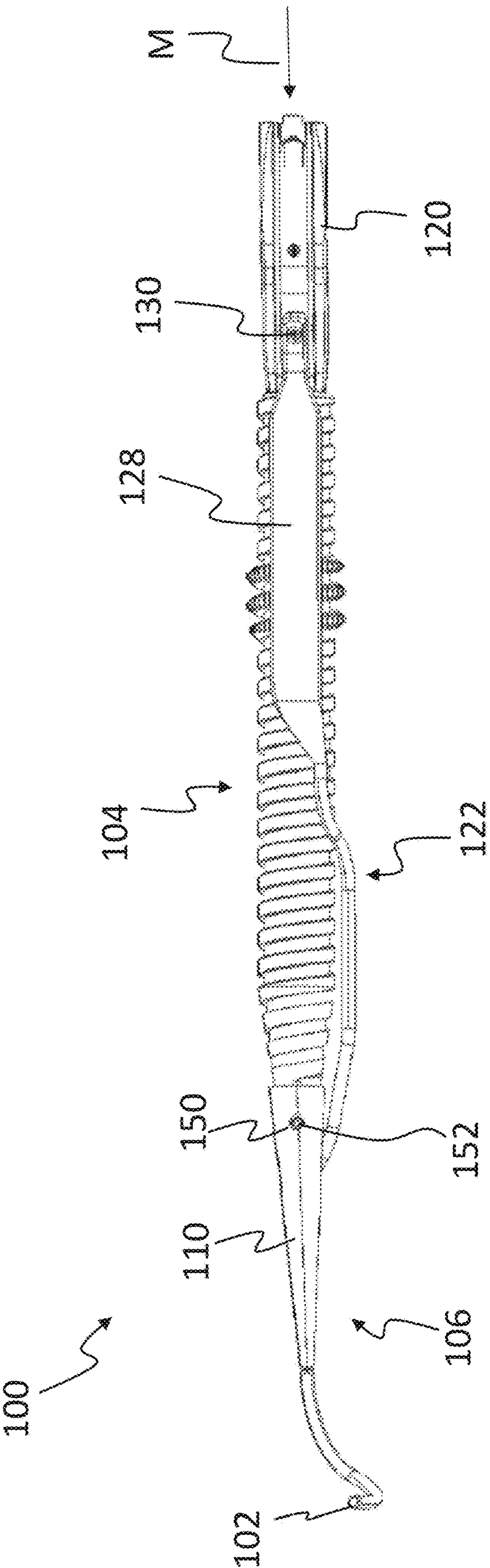
FIG. 3: shows that part of the discharge section that faces downward when the discharge section is installed in a discharge apparatus.

FIG. 3 shows that part of discharge section 100 that faces downward when discharge section 100 is installed in a discharge apparatus. Attachment mechanism 140 further comprises an internal attachment thread 150 that extends at least approximately perpendicular to central longitudinal axis M and that leads through widening member 110 and ends at attachment hole 142 as well as an attachment member 152 provided by an attachment screw. By screwing attachment screw 152 into internal attachment thread 150, attachment screw 152 may contact attachment pin 138 to fix attachment pin 138 inside attachment hole 142 via traction. Attachment screw 152 may be a grub screw or a headless screw.

Accordingly, attachment screw 152 may be loosened for adjusting the position of catching end 102 of catcher unit 106 relative to guide unit 104. Guiding member 122 is guided below guide unit 104 such that with its second section 128, guiding member 122 extends parallel and at a distance to guide unit 104. At its one end 130, guiding member 122 is attached to transfer unit 120.

Figure 4:
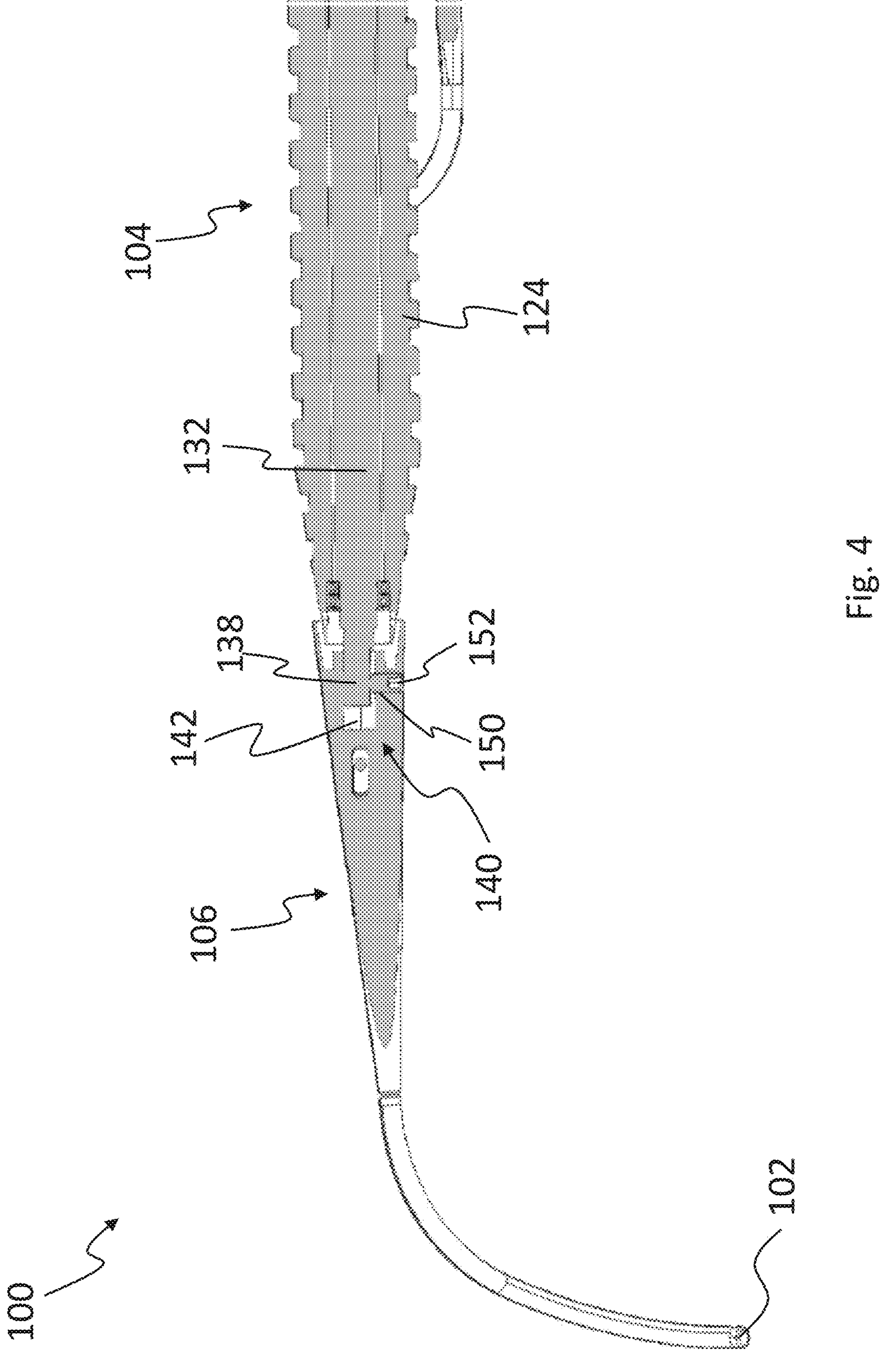
FIG. 4: shows the catcher unit and parts of the guide unit in a longitudinal sectional view of the discharge device.

FIG. 4 shows catcher unit 106 and parts of guide unit 104 in a longitudinal sectional view of discharge section 100. In this view, it can be seen that attachment mechanism 140 is in a state where attachment pin 138 can be moved inside attachment hole 142 since attachment member 152 is not in contact with attachment pin 138. It is thus possible to adjust the relative position of catching end 102. For fixing attachment pin 138 inside attachment hole 142, grub screw 152 may be screwed further into internal attachment thread 150 such that grub screw 152 contacts attachment pin 138 to provide a frictional connection.

With the guide unit's bolt 132 being rigidly attached to widening member 110 via attachment mechanism 140, hollow shaft 114 may be rotated for transporting a suspension element attached to a product along discharge section 100.

Figure 5:
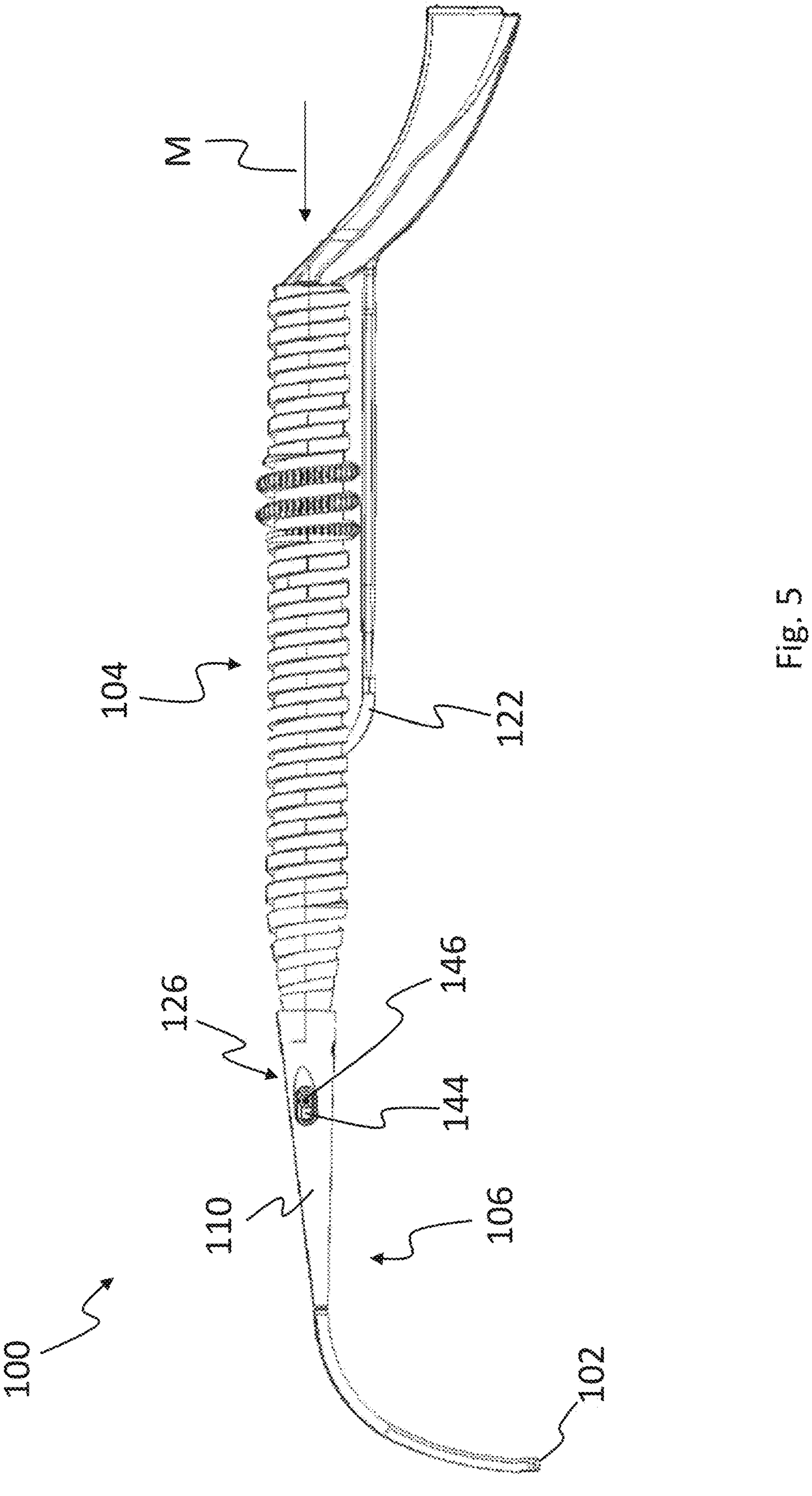
FIG. 5: shows the discharge section from a perspective in which the mounting of a guiding member at a widening member via the mounting screw is visible.

FIG. 5 shows discharge section 100 from a perspective in which the mounting of guiding member 122 at widening member 110 via mounting screw 146 is visible. Mounting mechanism 126 for mounting of guiding member 122 comprises an elongated mounting hole 144 that extends at least approximately parallel to central longitudinal axis M and that is formed in widening member 110 to allow movement of mounting screw 146 within elongated mounting hole 144 into various potential mounting positions. The geometry of elongated mounting hole 144 thus defines a predefined mounting range for mounting guiding member 122 to widening member 110.

Mounting screw 146 can be screwed into a mounting thread formed in guiding member 122 for fastening guiding member 122 at widening member 110. Thereby, the mounting position at widening member 110 may be selected in dependence on the adjusted position of catching end 102 of catcher unit 106 relative to guide unit 104. Accordingly, if catching end 102 is moved further away from guide unit 104, mounting screw 146 moves closer to that side of elongated mounting hole 144 that is closer to guide unit 104. Yet, if catching end 102 is moved closer to guide unit 104, mounting screw 146 moves closer to that side of elongated mounting hole 144 that is closer to catching end 102. Elongated mounting 144 thereby likewise defines an attachment range in which catching end 102 may be moved relative to guide unit 104 for adjusting the catching end's relative position.

Figure 6:
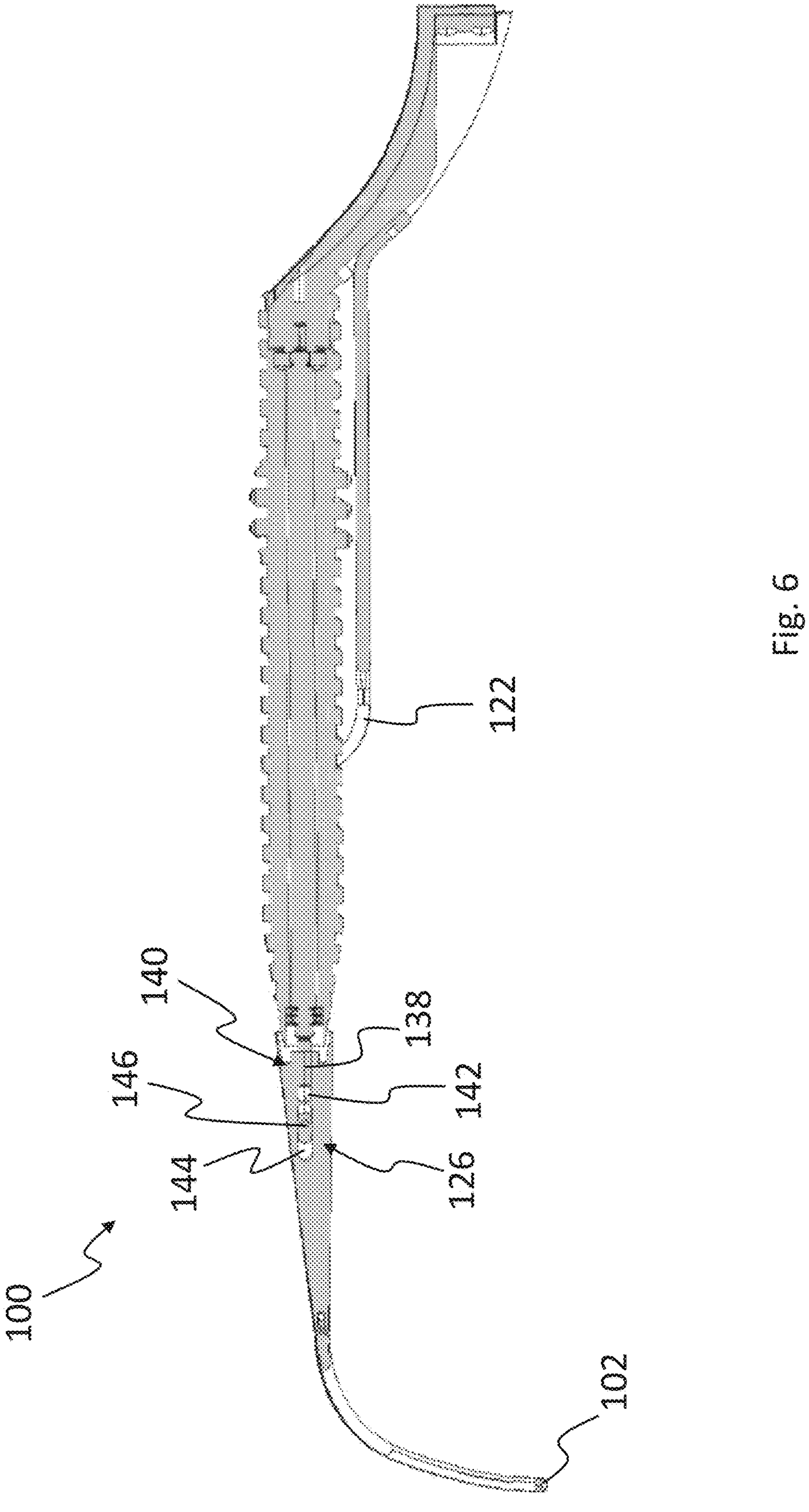
FIG. 6: shows the discharge section in a longitudinal sectional view in which an elongated mounting hole of the mounting mechanism is visible.

FIG. 6 shows discharge section 100 in a longitudinal sectional view in which elongated mounting hole 144 of mounting mechanism 126 can be seen. In particular, elongated mounting hole 144 extends through widening member 110 such that guiding member 122 can contact the elongated mounting hole from one side and guiding member 122 can be mounted to widening member 110 by screwing in mounting screw 146 from the opposite side. For adjusting the relative position of catching end 102, both, mounting screw 146 as well as attachment mechanism 140 formed by attachment pin 138, attachment hole 142 and attachment member 152 have to be loosened to be able to move attachment pin 138 inside attachment hole 144.

Figure 7:
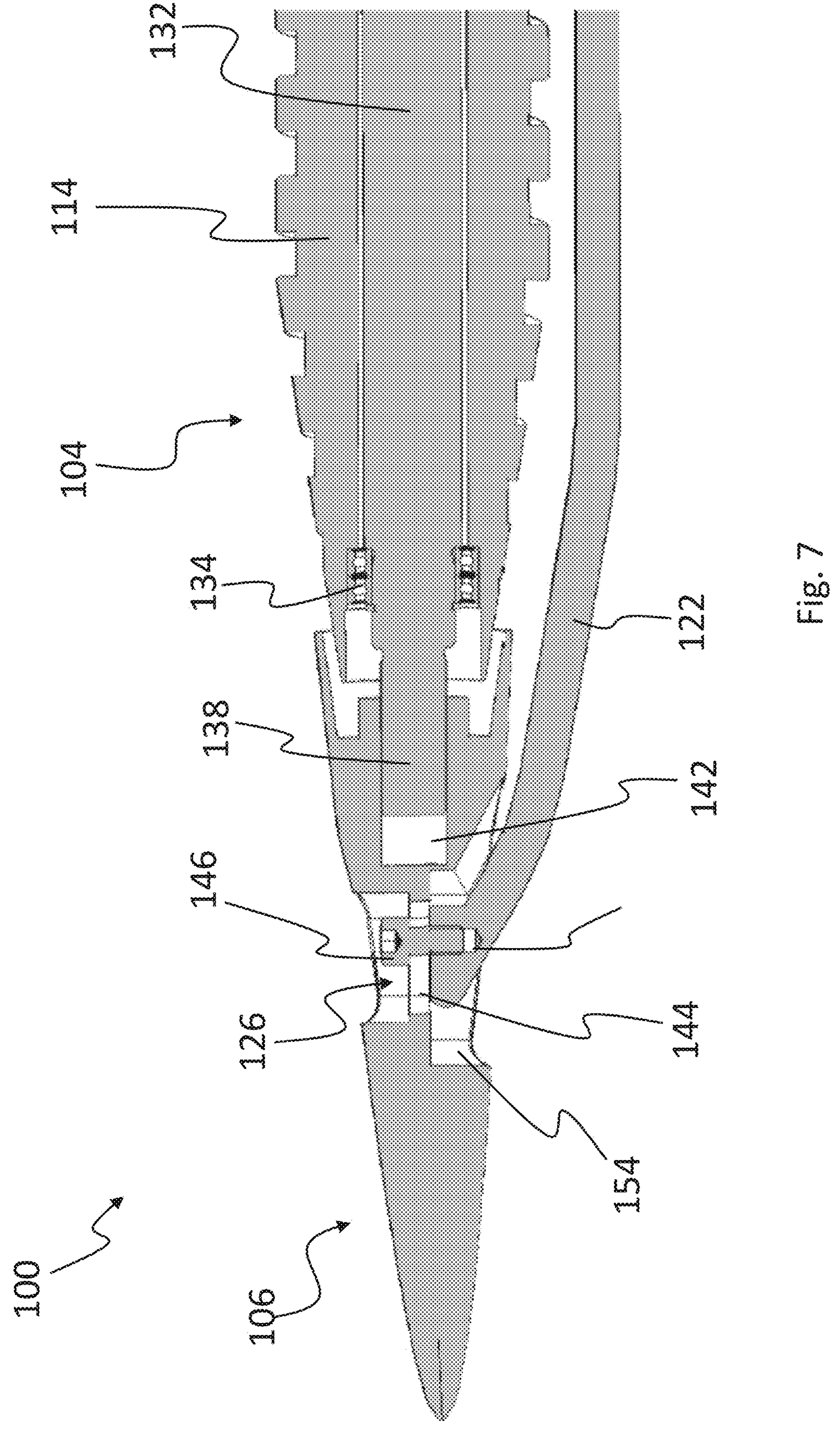
FIG. 7: shows a mounting mechanism in more detail in a longitudinal sectional view focusing on the transition from the catcher unit to the guide unit.

FIG. 7 shows mounting mechanism 126 in more detail in a longitudinal sectional view focusing on the transition from catcher unit 106 to guide unit 104. Mounting screw 146 is guided through elongated mounting hole 146 and screwed into mounting thread 148 for fastening guiding member 122 to widening member 110. Mounting hole 146 is located in a recessed part 154 of widening member 110 such that elongated mounting hole 144 can be accessed from both sides. In this view, also once again, bolt 132 with attachment pin 138 is visible. Attachment pin 138 is arranged inside attachment hole 142. Since mounting mechanism 126 is closed to mount guiding member 122 to widening member 110, attachment pin 138 cannot be moved inside attachment hole 142 irrespective of whether attachment pin 138 is fixed inside attachment hole 142 with an attachment member 152.

If mounting screw 146 is removed from mounting thread 148, widening member 110 can be moved further towards guide unit 104. Thereby, hollow shaft 114 moves further into widening member 110 with its tapered end part. Catching end 102 then moves further towards guide unit 104.

Figure 8:
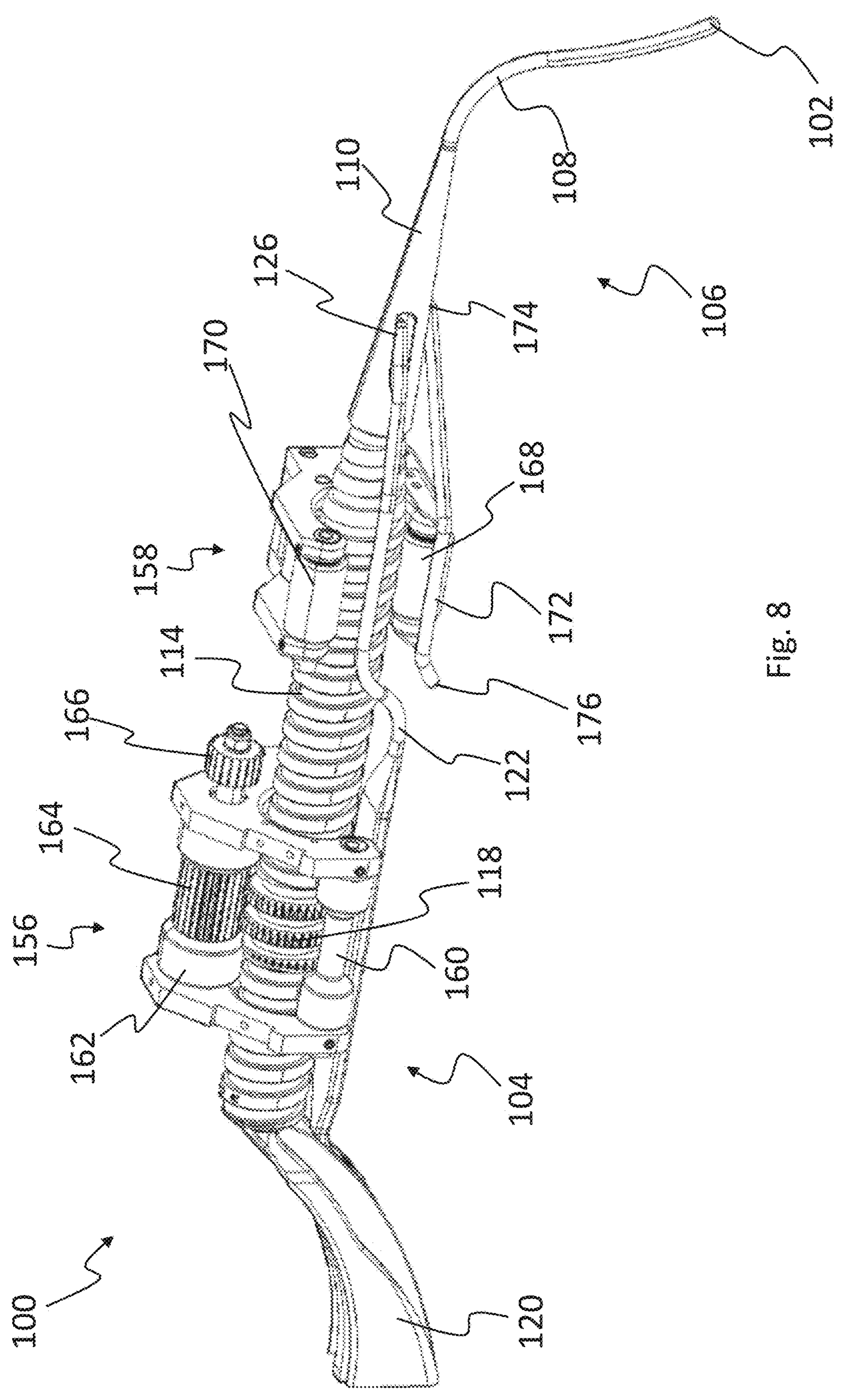
FIG. 8: shows the discharge section held by a first support unit and a second support unit.

FIG. 8 shows discharge section 100 held by a first support unit 156 and a second support unit 158. In particular, first support unit 156 and second support unit 158 are arranged to rotatably support guide unit 104. In alternative embodiment, only first support unit 156 may be present. For example, in this case, first support unit 156 may be located rather in the middle part of guide unit 104.

First support unit 156 comprises three support rollers 160, 162 of which two support rollers 160 are arranged symmetrically below hollow shaft 114. Both support rollers 160 below hollow shaft 114 are arranged to enable an uninterrupted transport path for the products hanging on suspension elements like loops or hooks or the like along hollow shaft 114. In particular, when hanging at hollow shaft 114, the products pass between both support rollers 160.

Hollow shaft 114 has thread groove winding 116 arranged on its outer surface for transporting suspension elements in the grooves along discharge section 100. For rotation hollow shaft 114, elevations 118 of thread groove winding 116 in the area of first support unit 156 comprise teeth to implement a pinion. Third support roller 162 likewise has a teeth-like structure 164 to implement a pinion the meshes pinion 118 of hollow shaft 114. Third support roller 164 further comprises a drive pinion 166 that serves for receiving a torque from a drive that may be part of a discharge apparatus comprising discharge section 100. When driving drive pinion 166, e.g., with an electric motor, third support roller 162 starts rotating and thereby transmits the drive torque to hollow shaft 114 via teeth-like structure 164. Hollow shaft 114 then rotates around bolt 132, which, in turn, stays stationary. After being transported along the length of guide unit 104, the products hanging on their suspension element are provided to transfer unit 120 that may deliver the products to rods for further processing of the products.

Second support unit 158 also comprises three support rollers 168, 170 that are arranged for supporting guide unit 104 and for allowing hollow shaft 114 to rotate. In contrast to first support unit 156, second support unit 158 has no support roller for transmitting a torque to hollow shaft 114. Second support unit 158 therefore merely provides support to hollow shaft 114.

Discharge section 100 further comprises catcher unit 106 that is releasably attached to guide unit 104 by means of attachment mechanism 140. Catcher unit 106 comprises cone-shaped widening member 110 and catching needle 108. The catching needle's free end forms catching end 102 of discharge section 100 and serves for catching and threading suspension elements attached to products provided, e.g., by a clipping machine. For adjusting the position of catching end 102 relative to guide unit 104, attachment mechanism 140 may be loosened to allow moving catcher unit 106 along an axial direction of guide unit 104 relative to guide unit 104. Thereby, catching end 102 can be moved away from guide unit 104 or closer to guide unit 104.

Yet, for adjusting the relative position of catching end 102, mounting mechanism 126 that mounts guiding member 122 to widening member 110 needs to be loosened, too. Discharge section 100 comprises a further guiding means 172 is attached to widening member 110 on its one end 174. Further guiding means 172 is guided substantially parallel to guide unit 104 and ends approximately at after second support unit 158. Further guiding means' other end 176 is a free end. Further guiding means 172 thus supports a suspension element during the transition from catcher unit 106 to guide unit 104. This is also the location at which the product typically changes its position from a horizontal position when lying on a conveying belt to a hanging position after falling off the convoying belt. Further guiding means 172 thus particularly provides additional stability in the situation where the product turns into a hanging position which may result in a larger degree of rocking.

FIG. 9 shows catching needle 108 of discharge device 100 in conjunction with a feeding unit 180 of a clipping machine 182 for feeding flexible suspension elements 184, like loops, for being attached to sausage-shaped products.

It is generally known that for the production of sausages, the filling material is inserted into a tubular or bag-shaped packaging casing. The sausages are portioned and closed on both sides with clips. For further processing the sausage, a suspension element is usually inserted into the second clip, usually a loop, and attached to the sausage product with that second clip. Subsequently the sausage products are transported out of the clipping machine with a discharge apparatus to storage rods for further processing, e.g. for boiling or smoking.

For producing a sausage-shaped product with clipping machine 182, the packing casing is positioned upstream to a displacer or gathering unit 186, 188, 190, 192 of clipping machine 182. Filling material, like sausage meat, is fed through a filling tube in feeding direction F and filled into the tubular packaging casing which is thereby pulled off from the filling tube. After a predetermined portion of filling material has been fed into the tubular casing, the filled tubular casing is gathered by the displacer unit 186, 188, 190, 192, which comprises two pairs of displacer or gathering elements 186, 188 and 190, 192, whereby a plait-like portion of casing material is formed between the pairs of displacer elements 186, 188 and 190, 192. The plait-like portion of casing material is at least approximately free from filling material.

Two closure means or closure clips, respectively, are attached to the plait-like portion by a clipping unit (not shown). The clipping unit is positioned between the two pairs of displacer elements 186, 188 and 190, 192. One of the closure clips closes the second end of the sausage-shaped product presently produced filled actually and the second closure clip closes the front end of the tubular casing remaining on the filling tube and starting the next sausage-shaped product.

A suspension element 184 provided to the clipping unit by a feeding unit 180 is attached to the presently produced sausage-shaped product by one of the two closure clips. A cutting unit (also not shown) may cut the plait-like portion between the two closure clips for separating the sausage-shaped product actually produced from the remaining tubular casing material. Suspension element 184 is caught by a catching needle 108 of the discharge section 100 for transporting the actually produced sausage-shaped product out of the clipping machine 182. The sausage-shaped product may be fed to a storage device which may include e.g. a smoking rod for pendulous storing the sausage-shaped product.

For catching suspension element 184 with catching needle 108, catching needle's catching end 102 needs to be aligned comparatively accurately with respect to the suspension element 184. With attachment mechanism 140 it is possible to move catching needle 108 forward or backward with respect to feeding unit 180 to align catching end 102 accurately with respect to suspension element 184. In particular, with discharge section 100 comprising attachment mechanism 140, only catcher unit 106 is moved while the rest of the discharge apparatus remains stationary. Accordingly, the alignment process can be carried out with comparatively low effort.

Accordingly, subsequent to displacer unit 186, 188, 190, 192 and in feeding direction F, discharge section 100 of a discharge apparatus is arranged for transporting the sausage-shaped product out of clipping machine 182. Catching needle 108 has a circular cross-section and extends approximately from the closing region of clipping machine 182, where the closing clip is applied to the plait-like portion of the filled and gathered tubular packing material, away from clipping machine 182 in the feeding direction F. Catching needle 108 has its catching end 102 directed towards clipping machine 182 in a downward direction so that it has the shape of a hook. Its other end 194 is directed away from clipping machine 182 and is coupled to widening member 110 of discharge section 100.

As already mentioned above, clipping machine 182 comprises feeding unit 180 for feeding flexible suspension elements 184, like loops, in a conveying direction C to clipping machine 182 for being attached to the sausage-shaped product by means of the first or second closing clip. Conveying direction C is approximately perpendicularly to feeding direction F. Feeding unit 180 comprises a positioning device 196, which extends longitudinally in conveying direction C and which is arranged with one end below catching end 102 of catching needle 108. Positioning device 196 comprises a first end 198, which is directed towards clipping machine 182. Second end 200 of approximately horizontally aligned positioning device 196 of feeding unit 180 is directed away from clipping machine 182. A carrier belt B is guided around positioning device 196. On carrier belt B, suspension elements or loops 184 are subsequently arranged in regular intervals and are aligned at least approximately perpendicular to conveying direction C. Belt B is guided around positioning device 196 in a manner as to rest at least on the upper surface of positioning device 196 between the first and second end 198, 200. Belt B is moved in conveying direction C as to stepwise slide across the upper surface of positioning device 196, thereby placing a loop 184 in a position below the catching end 102.

Moreover, positioning device 196 comprises a drive 202 coupled to second end 200 of positioning device 196 by an axis 204. Drive 202, which is a pivot drive, comprises a pivot lever 206 coupled at one end to pivot axis 204 and at the second end to a drive element 208, which, in the present embodiment, is a piston or cylinder drive element. Positioning device 196 may be reversibly pivoted between an upper and a lower position, wherein, in the upper position, positioning device 196 is disposed closer to catching end 102 and, in the lower position, positioning device 196 is moved away from catching end 102. In the upper position, loop 184 is positioned closer to catching end 102 to assure a save catching of loop 184. In the lower position of positioning device 196, belt B together with loops 184 may be moved forward without being engaged by catching needle 108.

Drive 202 and pivot axis 204 are mounted via a frame element or mounting bracket 224 to clipping machine 182. Clipping machine 182 further comprises an optional discharge device 210 including an engagement element 212 having a first end 214 facing clipping machine 182 and a second end 216 facing away from clipping machine 182 and a drive (not shown) for moving engagement element 212. Engagement element 212 is formed by a flat and at least approximately rectangular element which may be made of metal or plastic.

At the edge 214 directed towards the closing region of clipping machine 182, engagement element 212 comprises a recess 218 for releasing the suspension loop 184 disposed in the position to be fixed to a sausage-shaped product, when positioned in the release position. In the region of end 216 facing away from clipping machine 182, engagement element 212 comprises three slots 220 arranged parallel to each other and also parallel to conveying direction C. A mounting pin 222 is arranged at mounting bracket 224 above positioning device 196 and parallel to pivot axis 204. Engagement element 212 is coupled to mounting pin 222 by respective screws engaging slots 220.

Discharge device 210 may reversibly be moved from the release position into an engaging position in which engagement element 212 is positioned below catching end 102 for preventing a suspension loop 184 to be caught by catching needle 108. While reversibly moving engagement element 212 from the release position into the engaging position, engagement element 212 is shifted along slots 220 by a respective drive (not shown). Thus, by moving engagement element 212 into the engaging position, the catching of suspension loop 184 of the sausage-shaped product is prohibited and said product by-passes the discharge section 100 and can be fed to a measuring device for measuring e.g. its weight, length, diameter etc.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

Any reference signs in the claims should not be construed as limiting the scope.

LIST OF REFERENCE SIGNS

100 discharge section
102 catching end
104 guide unit
106 catcher unit
108 catching needle
108*a* first section of catching needle
110 widening member

112 catching needle's other end
114 hollow shaft
115 conical end shape of hollow shaft
116 thread groove winding
118 tooth-like structure
120 transfer unit
122 guiding member
124 first section of guiding member
126 mounting mechanism
128 second section of guiding member
130 other end of guiding member
132 bolt
134 ball bearings
136 one end of bolt
138 attachment pin
140 attachment mechanism
142 attachment hole
144 mounting hole
146 mounting screw
148 mounting thread
150 attachment thread
152 attachment member
154 recessed part of widening member
156 first support unit
158 second support unit
160 two support rollers of first support unit
162 third support roller of first support unit
164 teeth-like structure
166 drive pinion
168 two support rollers of second support unit
170 third support roller of second support unit
172 guiding means
174 one end of guiding means
176 guiding means' other end
180 feeding unit
182 clipping machine
184 suspension element
186 displacer or gathering unit
188 displacer or gathering unit
190 displacer or gathering unit
192 displacer or gathering unit
194 other end of catching needle
196 positioning device
198 first end of positioning device
200 second end of positioning device
202 drive
204 pivot axis
206 pivot lever
208 drive element
210 discharge device
212 engagement element
214 edge
216 end facing away from clipping machine
218 recess of engagement element
220 screws engaging slots
222 mounting pin
224 mounting bracket
M central longitudinal axis of discharge section
F feeding direction
C conveying direction
B carrier belt

The invention claimed is:

1. A discharge section for a discharge of products traveling downstream along the discharge section with the products each having at least one flexible suspension element connected thereto, the discharge section comprising a catcher unit and a guide unit, wherein the catcher unit comprises a catching end and is configured for catching at least one suspension element of the product with the catching end, and the guide unit has an elongate configuration and is arranged downstream of the catcher unit to be configured for receiving the at least one suspension element of the product from the catcher unit and for transporting the product at its at least one suspension element downstream along the discharge section, and wherein the catcher unit and the guide unit are releasably attached to each other by an adjustable connection, the adjustable connection being configured to enable an adjustment of a position of the catcher unit's catching end relative to the guide unit, wherein the discharge section further comprises a guiding member having an elongate configuration extending adjacent the guide unit to be configured for guiding the product along at least a part of the length of the guide unit, the guiding member being mounted to a widening member of the catcher unit at a mounting position by a releasable connection between the guiding member and the widening member, wherein the widening member is configured to widen as the widening member extends downstream, and wherein the mounting position depends on the adjusted relative position of the catching end of the catcher unit.

2. The discharge section of claim 1, wherein the adjustable connection is configured to enable an adjustment of the catching end's relative position parallel to an axial direction of the guide unit.

3. The discharge section of claim 1, wherein the adjustable connection is configured to enable an adjustment of the catching end's position in a continuous manner.

4. The discharge section of claim 1, wherein the adjustable connection is configured to enable an adjustment of the catching end's position in several discrete steps.

5. The discharge section of claim 1, wherein the adjustable connection attachment mechanism comprises an attachment pin formed as part of the guide unit and an attachment hole configured for receiving the attachment pin and being formed in the catcher unit or wherein the adjustable connection comprises an attachment pin formed as part of the catcher unit and an attachment hole configured for receiving the attachment pin and being formed in the guide unit, and wherein the attachment pin is positioned in the attachment hole for attaching the catcher unit and the guide unit to each other.

6. The discharge section of claim 5, wherein the attachment pin has circular cross-section or a polygonal cross-section and the attachment hole has a cross-section that is complementary to the pin's cross-section.

7. The discharge section of claim 5, wherein the attachment pin comprises an external thread and the attachment hole comprises an internal thread such that the catcher unit and the guide unit are attached to each other by screwing in the attachment pin into the attachment hole.

8. The discharge section of claim 5, wherein the adjustable connection comprises at least two attachment holes having different attachment hole depths that are configured such that the attachment pin can be inserted into each of the at least two attachment holes with a different maximum length.

9. The discharge section of claim 5, wherein the adjustable connection comprises a fastener an attachment member that is configured for fixation of the attachment pin inside the attachment hole.

10. The discharge section of claim 9, wherein the fastener is a threaded fastener accommodated in an attachment thread configured to enable traction of the attachment pin housed in the attachment hole for fixing the attachment pin in the attachment hole.

11. The discharge section of claim 5, wherein the guide unit comprises a bolt and a hollow shaft rotatable arranged on the bolt, the attachment pin or the attachment hole being formed as part of the bolt.

12. The discharge section of claim 11, wherein the attachment pin has a diameter that is different from the diameter of the rest of the bolt.

13. The discharge section of claim 1, wherein the releasable connection is configured to enable adjustment of a mounting position within a predefined mounting range.

14. The discharge section of claim 13, wherein the releasable connection comprises a mounting hole formed as part of the catcher unit that is configured to enable the mounting of the guiding member at several mounting positions.

15. A discharge apparatus configured for a discharge of products, each with at least one flexible suspension element connected thereto, out of a clipping machine that is configured for placing and closing clips on the product, the discharge apparatus comprising the discharge section of claim 1.

* * * * *